United States Patent [19]
Monarez

[11] Patent Number: 5,155,930
[45] Date of Patent: Oct. 20, 1992

[54] BAIT THREADING DEVICE

[76] Inventor: Faustino Monarez, 6237 Alkire Ct., Arvada, Colo. 80004

[21] Appl. No.: 708,491

[22] Filed: May 31, 1991

[51] Int. Cl.⁵ ............................................. A01K 97/00
[52] U.S. Cl. ............................................. 43/4
[58] Field of Search ................................. 43/4

[56] References Cited
U.S. PATENT DOCUMENTS

| | | | |
|---|---|---|---|
| 2,948,979 | 8/1960 | Kulp | 43/4 |
| 4,118,881 | 10/1978 | McFarlane | 43/4 |
| 4,848,019 | 7/1989 | Toogood | 43/4 |
| 4,915,631 | 4/1990 | Robinson et al. | 43/4 |

Primary Examiner—Richard K. Seidel
Assistant Examiner—Patty E. Hong
Attorney, Agent, or Firm—Timothy J. Martin; Dana S. Rewoldt

[57] ABSTRACT

A bait threading device receives a piece of bait on a shank longitudinally mounted to a handle. The shank terminates in a distal tip, preferably canted, that receives the barb of a fish hook, and the handle has an arm member that projects outwardly therefrom and includes structure, such as a notch, to receive a portion of fishing line connected to the hook so that the hook is securely retained with the line held tautly. A piece of bait may be advanced off of the shank and onto the hook and, if necessary, the fishing line. By canting the shank end and by selecting the shank and arm lengths, the end of the shank may be aligned with the barb portion of the hook and the line may be aligned with the shaft of the hook. To this end, the shank may be adjustably mounted to the handle. Either of the shank or the arm may be detachable, and the handle provides a storage compartment for one or both.

19 Claims, 5 Drawing Sheets

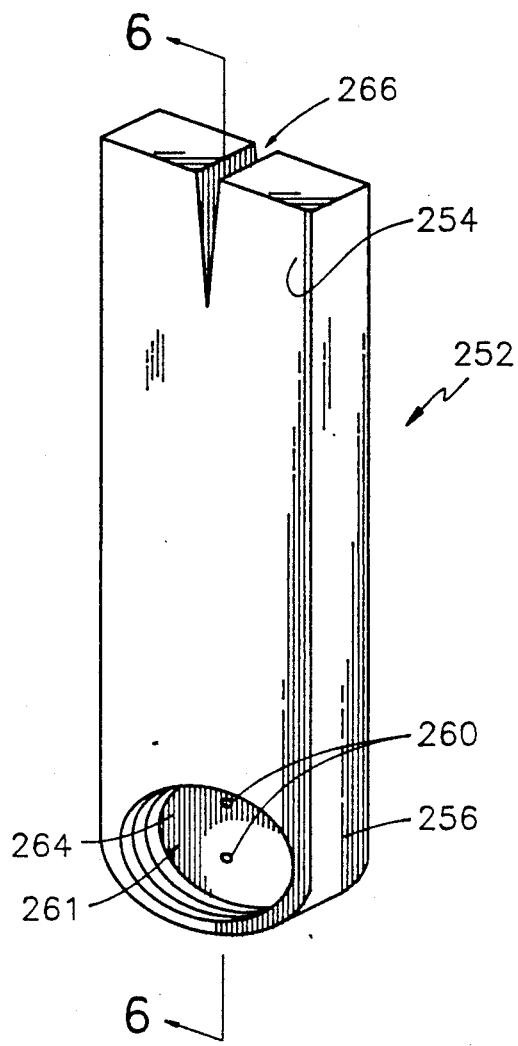
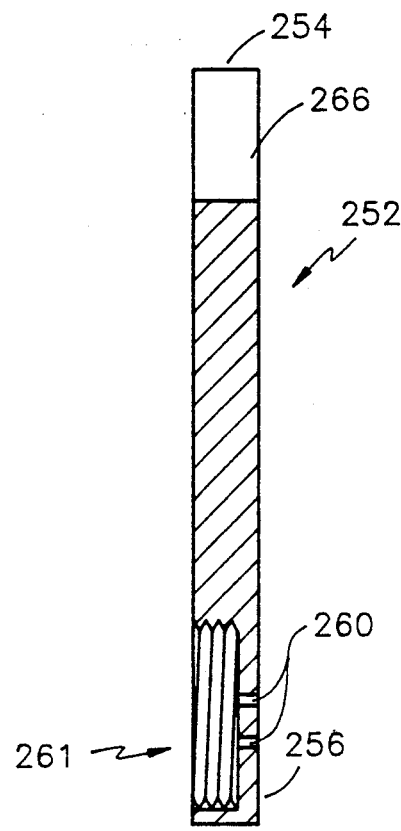
FIG.5
FIG.6
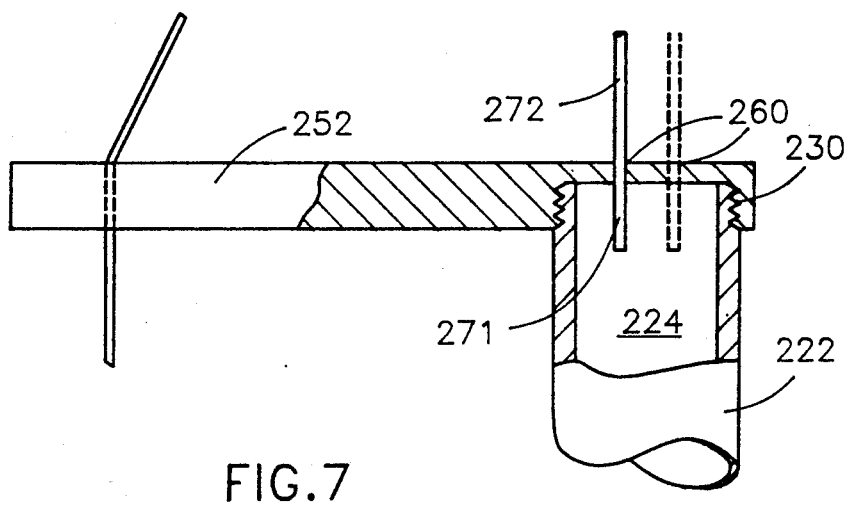
FIG.7

BAIT THREADING DEVICE

FIELD OF THE INVENTION

The present invention relates to fishing apparatus. More specifically, this invention concerns devices adapted to facilitate the threading of a piece of bait onto a hook which is secured to a fishing line.

BACKGROUND OF THE INVENTION

Ever since prehistoric times, fishing has been an integral part of providing food for humankind. Fish are caught in a variety of different ways. They can be caught by spear fishing, by using nets, or by using hooks connected to fishing lines. Despite the fact that civilization has become more agriculturally based, fish still to a substantial provide source for the world. In addition, though, fishing has become a well-loved sporting activity.

In the non-commercial area of fishing, fishing poles and various lures, hooks, tackle and lines make up the equipment for catching fish as a sport. Although a variety of different lures and flies have been developed to attract fish to the hooks, often the best and most efficient way to catch fish is by using live bait. Live bait tends to attract fish as long as the bait remains in a state that resembles the natural lively state of the bait, and camouflages the metal of the hook. One disadvantage of using live bait is the difficulty in baiting the hook in such a manner that the bait still looks lifelike. Another problem is a bait's tendency to fall off the hook when cast due to the difficulty of securing the bait to the hook. Also, many people exhibit a squeamish reaction to baiting a hook. Finally, the sometimes small size of a hook causes difficulty in attaching the bait, and a person may inadvertently injure himself or herself by jabbing the barb of a hook into a finger when trying to bait the hook.

These problems have been addressed by the development of the bait threaders. U.S. Pat. No. 4,073,083 to Davis shows a bait threader having a stationary shank attached to a handle. U.S. Pat. No. 2,948,979 to H.W. Kulp shows a bait threader having a shank and a lateral projection to wrap the fishing line around. U.S. Pat. No. 4,118,881 shows a shank and a horizontal base adapted to have the fishing line wrapped therearound. Bait threaders have a straight shank onto which bait, such as a worm, can be threaded. The hook is placed on top of the shaft and the bait is slid from the shank onto the hook. Despite their advantages, prior art bait threaders were somewhat difficult to use because each of the threaders is held, the fishing line is held to secure the hook on the shank and the bait is then moved from the shank to the hook. The hook, which is typically placed on the top of the shank, often dislodges from the shank prior to the entire bait being placed on the hook. This results in puncturing the bait or having a part of the worm dangle off the end of the hook such that fish can eat the unsecured portion of the worm without being hooked and caught. Accordingly, there remains a need for an improved bait threader which allows the bait to be efficiently threaded onto the hook while the hook remains stabilized.

SUMMARY OF THE INVENTION

An object of the present invention is to provide a new and useful bait threader which stabilizes the hook in such a manner that the worm can be threaded onto the hook efficiently and easily.

Another object of the present invention is to provide a worm threader that can be packaged in a small efficient package.

A further object of the present invention is to provide a bait threader which can be disassembled and stored in such a manner that the sharp edges of the shank are not protruding outwardly in the fishing box.

A still another object of the present invention is to provide a bait threader that has an adjustable shank so that the hook and line can be easily secured to the shank when the bait is being transferred from the threader to the hook.

Yet another object of the present invention is to provide a bait threading device which can hold the hook and line in a taut manner so that a person can hold the device in one hand and advance the bait onto the hook with the other hand.

The bait threading device according to the present invention in its broad form is adapted to facilitate the mounting of a piece of bait on a hook secured to a fishing line. To this end, the threading device is adapted to receive the barb of a hook. The bait threading device includes a handle having a longitudinal axis. An arm member associated with the handle and projecting laterally outwardly therefrom to terminate in a free arm end. Structure is provided to releasably retain a portion of the fishing line on the arm member at a location that is spaced laterally outwardly of the handle. The bait threading device also includes an elongated shank adapted to be mounted onto the handle and operative to receive a piece of bait thereon. The shank when mounted extends longitudinally from the handle to terminate in a hook receiving end having a recess adapted to receive the barb point of the hook. When the barb point of the hook is inserted into the recess a length of the fishing line that is secured to the hook is retained by the line receiving means. This holds taut the line and the hook in the recess. The piece of bait which has previously been received on the shank can be advanced along the shank and onto the hook in a smooth, efficient manner.

Preferably, the bait threading device includes a handle having a hollow interior with a surrounding sidewall so that the handle has closed end and an open end; an end cap mounts on the handle to close the open end thereby to form a storage compartment. The arm member may mount the elongated shank axially to the handle, and the shank and the arm member are sized and positioned so that the shaft of the hook is substantially parallel to the hook receiving end of the shank when the barb point of the hook is received in the recess in the shank and the fishing line is received in the line receiving means. To this end, the end portion of the shank may be formed at an acute angle, if desired. The arm member may be permanently affixed to the handle portion of the bait threading device, or, alternatively, the arm member may releasably attach to the handle. For example, the handle may threadably mount to the arm member, the arm member may press fit onto the handle or be secured by a separate threaded cap. Where a securing cap structure is used, it may include one or more mounting holes for mounting the elongated shank to the handle whereby the elongated shank extends longitudinally from the handle, and a frictional retainer may be used to help secure the shank. If desired, the handle may be formed with a surrounding sidewall that diverges from one end continuously to the other end. This divergent handle permits the arm member and the shank to be stored within the hollow interior of the handle.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 5 is a perspective view of an arm member of a third exemplary embodiment of the present invention;

FIG. 6 is a cross-sectional view taken about lines 6—6 of FIG. 5;

FIG. 7 is a side view in partial cross-section showing the third exemplary embodiment employing the arm member of FIGS. 5 and 6.

DETAILED DESCRIPTION OF THE PRESENT INVENTION

The present invention relates to a device which is adapted to facilitate baiting a fish hook. Specifically, the device allows the user to bait the fish hook easily because it facilitates the positioning of the hook and the fishing line in a stable position relative to the shank of the bait threading device so that the bait can be smoothly transferred from the shank to the hook.

Figure 1:
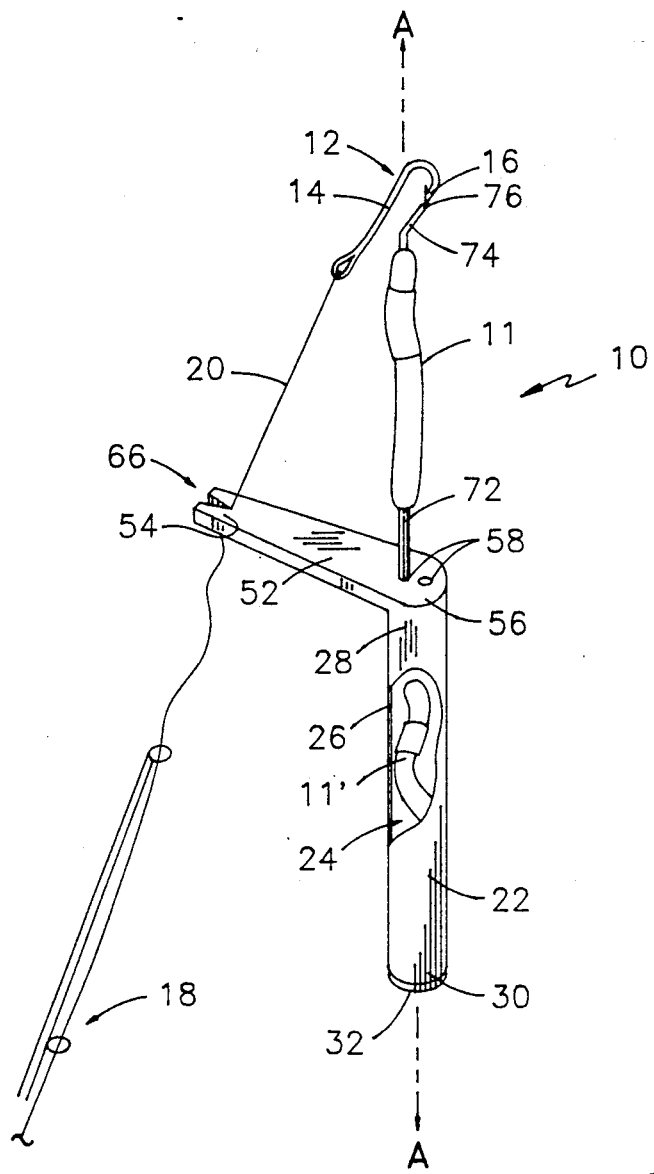
FIG. 1 is a perspective view, partially cut-away, showing a first exemplary embodiment of the present invention.
Figure 2:
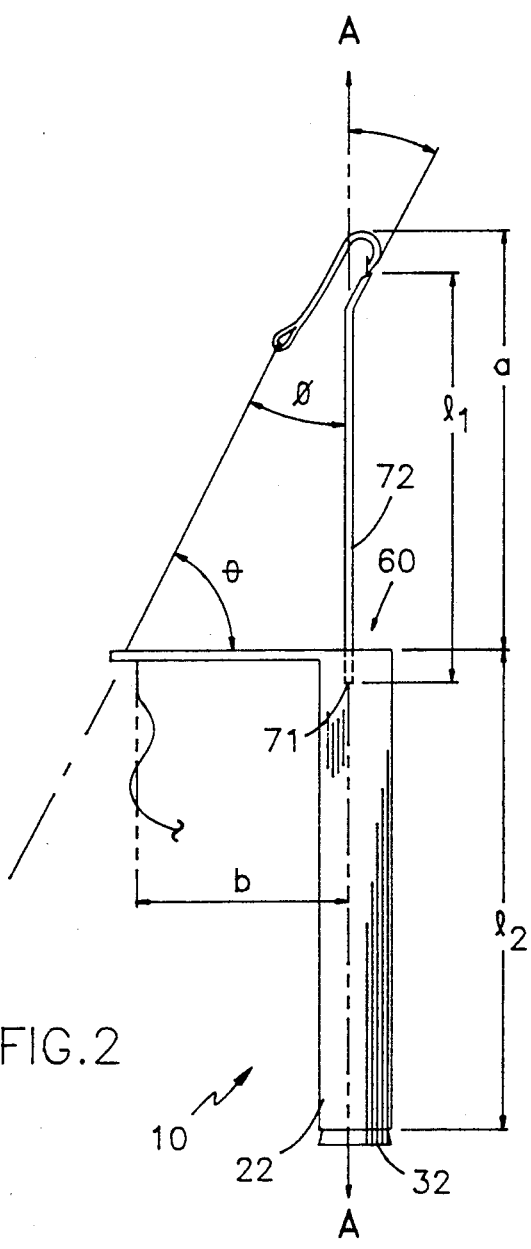
FIG. 2 is a side view in elevation of the exemplary embodiment of the present invention as shown in FIG. 1.
Figure 3:
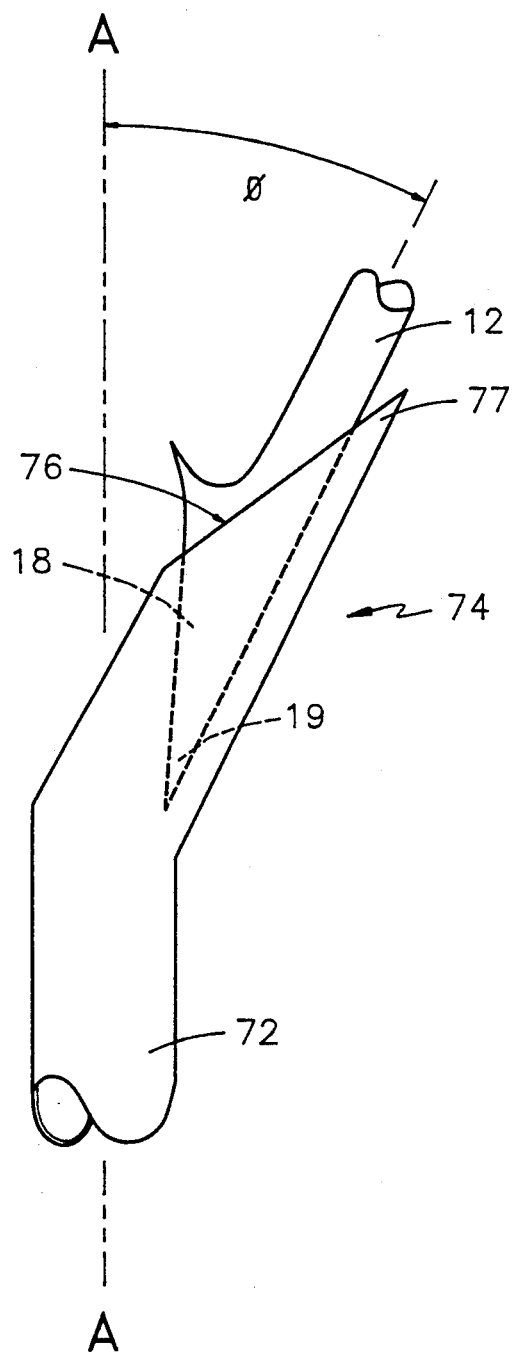
FIG. 3 is an enlarged side view in elevation showing the hook receiving end located at the distal end of the shank which receives a fishing hook.

A first exemplary bait threading device 10 is shown in FIG. 1-3 and is adapted to facilitate the mounting of a piece of bait, such as worm 11, onto a hook 12 which is secured to a fishing line 20 carried by fishing pole 18. The hook 12 has a shaft 14 which includes a barb 16 that terminates in a barb point 19. As can be seen in FIG. 1, threading device 10 has an elongated handle 22 with a longitudinal axis A. An elongated shank 72 mounts axially to the handle 22. The elongated shaft 72 is also operative to slideably receive a piece of bait thereon. The elongated shank 72 extends longitudinally from the handle 22 when mounted thereon and terminates in a hook receiving end 74 having a recess or opening 76. Hook receiving end 74 is best shown in FIG. 3 where it may be seen that opening 76 is formed by beveling the distal end of shank 72 to create a sharp tip 77. Tip 77 thus helps pierce a piece of bait when the bait is to be mounted onto shank 72. Opening 76 is adapted to receive the barb point 19 of the hook 12, as shown in phantom in FIG. 3, so that the bait on the shank 72 can be transferred to the hook 12. To this end, shaft 72 may be a hollow tube so that opening 76 is provided by the open end of the tube. It should be appreciated, though, that shank 72 could be a solid rod with a cavity defining opening 76.

The device 10 also has an arm member 52 that is associated with the handle 22 and that projects laterally outwardly therefrom to terminate in a free arm end 54. Located on the arm member 52 is line receiving means for releasably securing and retaining a portion of the fishing line 20. The line receiving means can simply be a slit or a notch structure, but other receiving structures or elements may be employed without departing from the scope of the present invention. The preferred line receiving structure shown in FIG. 1 is a V-shaped notch 66 spaced laterally outwardly of the handle 22 on the arm member 52 at free end 54.

As can be readily seen in FIG. 1 handle 22 has a hollow interior 24 with a surrounding sidewall 26, a closed end 28 and an open end 30 opposite of the closed end 28. Furthermore, the device includes an end cap 32 which is dimensioned and operative to mount onto the open end 30 of the handle 22 to close the open end 30 whereby the hollow interior 24 forms a storage compartment. This storage compartment can be used to store bait, such as worm 11' hooks and various pieces of fishing tackle, a fishing licenses, etc. In the preferred embodiment, the handle 22 forms a storage compartment sized to accept the elongated shank 72 which is releasably mounted to handle 22. As known to those skilled in the art, a variety of different means for enclosing the open end of the handle can be employed. For example, a screw-on cap, a stopper, or a snap-fit cap can secure the open end of the storage compartment formed by the hollow handle.

The arm member 52 of this first exemplary is permanently affixed to the handle 22 at an attachment end 56 located proximate the handle 22, and free arm end 54 is located opposite of said attachment end 56 which forms a closed end 60 for handle portion 22. Preferably, the bait threading device 10 of FIGS. 1 and 2 is formed of one integral piece of plastic. The arm member 52 opposite of the free arm end 54 also has mounting means for mounting the elongated shank 72 axially to the handle 22. Here, the mounting means is formed by a plurality of mounting holes 58 that are preferably dimensioned to permit the elongated shank 72 to be slideably received in the hollow interior of the handle 22. These mounting holes 58 permit the elongated shank 72 to be positioned at a variety of heights relative to the arm member 52.

Turning again to FIGS. 2 and 3, the preferred geometric relationships between the arm member 52, the handle 22 and the shank 72 may be appreciated with greater understanding. In operation, the bait threader device 10, has bait threaded onto the elongated shank 72. Next, the barb point of hook 12 is positioned in opening 76 of the hook receiving end 74 of the shank 72. The hook 12 then is secured in the opening 76 by placing a portion of the fishing line 20 in the V-shaped notch 66 which acts then to hold the fishing line 20 in a taut position relative to the shank 72. To facilitate securing the hook 12 by making the fishing line 20 taut the shank 72 has an exposed length of "$l_1$ which can be variably selected by positioning a portion of the proximate shank end 71 within the hollow interior of the handle 22. Changing the length $l_1$ of the shank 72 permits fishing line 20 to be securely held in the taut position and secures hook 12 in recess 76 regardless of the size or length of the hook 12. In any event, the effective longitudinal length of shank 72 and hook 12 is "a", as shown in FIG. 2.

Line 20 distends at an angle $\theta$ with respect to arm member 52, and, since arm ember 52 is radial with respect to axis A, line 20 makes an acute angle φ with respect to axis A. Angle φ being the complement to angle θ. Since it is desirable that bait may easily slide onto a portion of line 20. Shaft 14 of hook 12 should be collinear with line 20. Thus, hook receiving end portion 74 of shank 72 is canted also at an acute angle φ relative to the longitudinal axis A of the shank 72. Preferably, acute angle φ is between 30°−85°. To this end, it may be seen that angles θ and φ are determined by the effective length "b" of arm member 52 and the effective longitudinal length "a" of the extension of shank 72 and hook 12 from the top or closed end 60 of handle 22.

Further, with reference again to FIG. 2, the first exemplary embodiment is constructed so that handle 22 has a selected length "$l_2$". The length $l_2$ of the handle 22 is preferably longer than the length $l_1$ of the shank 72. The longer length of the handle 22 permits the elongated shank 72 to be stored within the storage compartment formed by the hollow interior of the handle 22 when detached therefrom.

Figure 4:
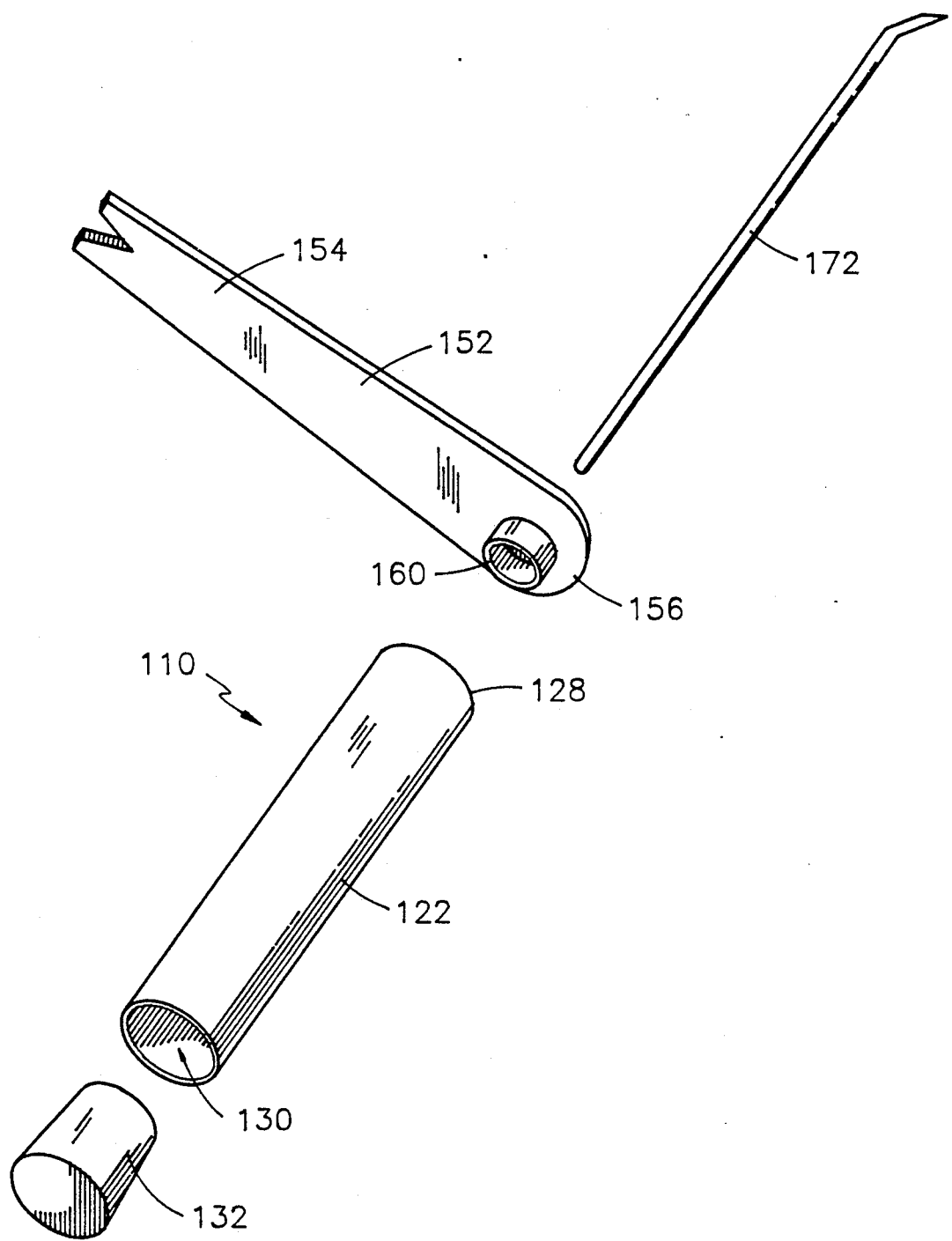
FIG. 4 is a exploded view in perspective of a second exemplary embodiment of the present invention.

In FIG. 4 an exploded exemplary embodiment of the bait threading device 110 is shown. Here, the elongated shank 172 is adapted to be mounted into arm member 152 which is securely affixed to handle portion 122. The handle portion 122 is shown as a cylindrical tube with two open ends 128 and 130. Further, the bait threading device 110 includes an end cap or cork 132 that is operative to be mounted on the handle portion 122 to close open end 130. The arm member 152 of this embodiment includes a free arm end 154, and an attachment end 156 is located opposite the free arm end 154. As can be seen in FIG. 4, the attachment end 156 of arm member 152 includes a securing means for securing the arm member 152 to open end 128 of the handle portion 122. The securing means shown in FIG. 2 is a hollow post 160 sized and dimensioned to fit snugly within open end 128. The arm member 152 can be frictionally secured to the handle 122 by the hollow post 160 to the handle 122 or an adhesive can be used to attach arm member 152 and handle 122 in a permanent manner. If desired, some releasable inter-locking structure known in the art could be utilized to secure the post 160 to the hollow handle 122.

In FIGS. 5, 6 and 7 a third alternative exemplary embodiment of the present invention is shown. This embodiment like the other embodiments includes a handle 222 having a longitudinal axis and a hollow interior 224, an arm member 252, associated with the handle and projecting laterally outwardly therefrom to terminate in a free arm end 254, and an elongated adjustable shank 272 having a proximal shank end 271 which is adapted to be mounted on said handle 222 at the mounting holes 260.

Arm member 252 is readily shown in FIGS. 5 and 6, and arm member 252 has attachment end 256 that includes means, such as a pair of holes 260 in end wall 264, for mounting the proximal shank end 271 of the elongated shank 272. Arm member 252 has a threaded bore 261 sized to threadably receive threaded open end 230 of handle 222. In this manner arm member 252 forms a cap-like structure that is operative to be detachably mounted on the end 230 of the handle 222 so that end wall 264 closes one end thereof. Shank 272 can fit in either hole 260 as shown in phantom in FIG. 7, and line 20 is again retained by notch 266 in free end 254 of arm member 252.

Figure 8:
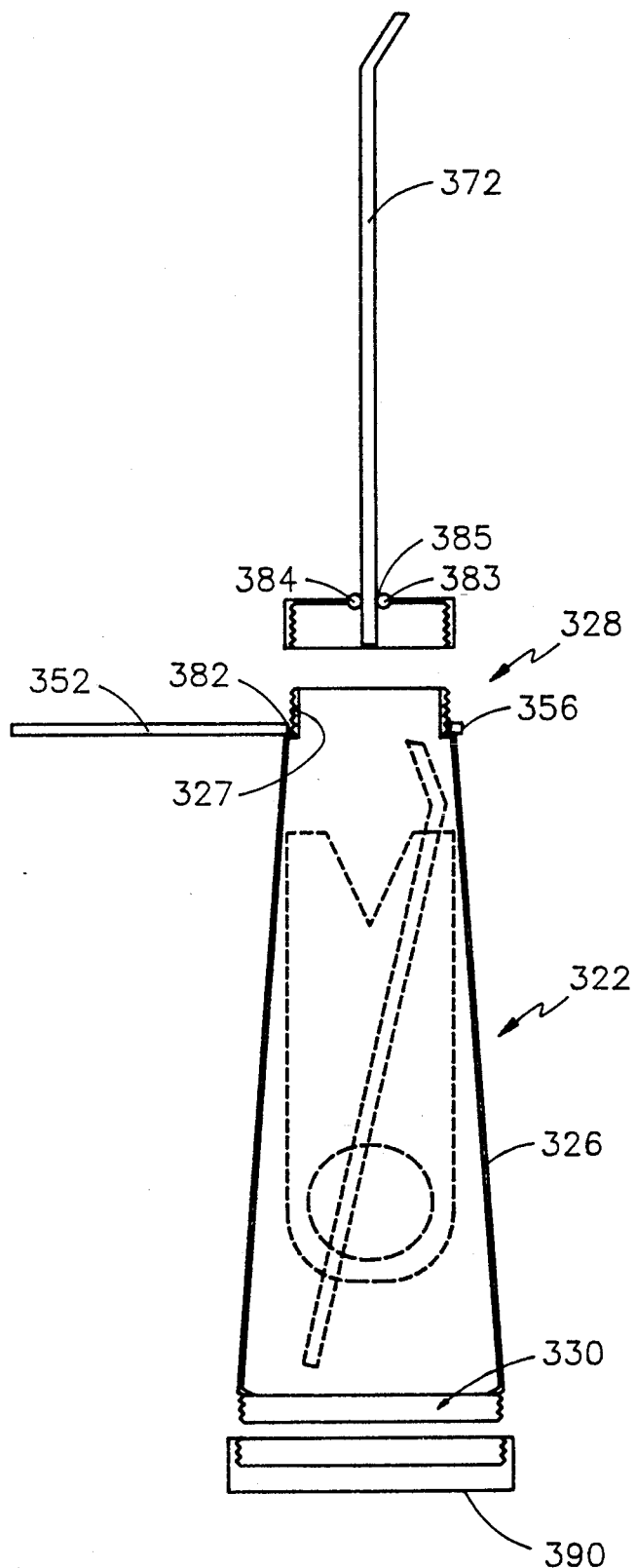
FIG. 8 is a side view in cross-section showing another exemplary embodiment of the present invention with the arm member and elongated shank shown in phantom within the handle portion.

In FIG. 8 another exemplary embodiment of the present invention is shown. In this embodiment, again the invention includes an elongated shank 372, an arm member 352, line receiving means and a handle 322. The handle portion 322 of the present invention includes surrounding sidewalls 326, a first end 328 and a second end 330. The surrounding sidewalls 326 continuously diverge from the end 328 to the end 330 so that in the hollow handle 322 increases in cross-sectional area in a direction from said end 328 toward said end 330 so that the end 330 is enlarged with respect to the end 328. The surrounding sidewalls are sized and dimensioned to receive and store both the elongated shank 372 and the detachable arm member 352 when they are detached. The arm member 352 in this embodiment does not include a threaded cap-like structure. Instead, attachment arm end 356 has an opening 382 dimensioned to receive a threaded end portion 327 of handle 322. A threaded cap 380 is received on end portion 327, and Cap 380 thus operates both to close end 328 of handle 322 and releasably secure arm member 352 in a mounted position on handle 322, as shown in FIG. 8. Cap 380 also includes an axial hole 382 that receives a friction element such as resilient rubber grommet 384 therein. Grommet 384 has an axial opening 385 adapted to securely position the shank 372 such that when a fishing line is retained by arm member 352, the shank does not inadvertently slip further down into the hollow handle 322 due to the pressure placed on the shank 372 by securing the line. Open end 328 as in the previous embodiments includes an end cap structure 390 for securing the hollow interior of the handle.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A bait threading device adapted to facilitate mounting of a piece of bait on a hook secured to a fishing line wherein said hook has shaft having a barb terminating in a barb point, comprising;

a handle including a handle portion having a longitudinal axis and an arm portion associated with said handle portion and projecting laterally outwardly therefrom to terminate in a free arm end;

line receiving means for releasably retaining a portion of said fishing line, said line receiving means located on said arm portion and spaced laterally outwardly of the handle; and an elongated shank having a longitudinal axis, and adapted to be mounted to said handle and operative to receive a piece of bait thereon, said shank when mounted extending longitudinally from said handle to terminate in a hook receiving end which projects at an acute angle relative to said longitudinal axis of said shank, having a recess adapted to receive the barb point of said hook therein so that, when the barb point of said hook is positioned in the recess, a length of said fishing line that is secured to said hook may be trained from said hook to said line receiving means and held taut thereby so that a piece of bait received on said shank may be advanced along said shank and thereafter onto said hook.

2. A bait threading device according to claim 1 wherein said handle has a hollow interior, a surrounding sidewall, a closed end and an open end opposite said closed end, and including an end cap operative to mount on said handle to close the open end whereby the hollow interior forms a storage compartment.

3. A bait threading device according to claim 2 wherein said arm portion is detachably mounted to said handle portion and said elongated shank is detachably mounted to said handle, said compartment being sized and shaped to store said elongated shank and said arm portion when detached from said handle portion.

4. A bait threading device according to claim 1 wherein said handle portion has a first end and an open second end, said handle portion having a cross-sectional area that increases in a direction from said first end toward said second end.

5. A bait threading device according to claim 1 wherein said acute angle is between 30° and 85°.

6. A bait threading device according to claim 1 wherein said shank and said arm portion are sized and positioned so that shaft of a hook is substantially parallel to said hook receiving end portion when the barb point of said hook is received in said recess and said fishing line is received in said line receiving means.

7. A bait threading device according to claim 1 wherein said shank is mounted axially of said handle.

8. A bait threading device according to claim 8 including means for adjustably mounting said shank longitudinally with respect to said handle.

9. A bait threading device according to claim 9 wherein said means for adjustably mounting including a friction element made of resilient material and operative to frictionally and slideably secure said shank to said handle.

10. A bait threading device according to claim 1 wherein said arm portion has means for releasably securing an attachment end thereof to said handle portion, said attachment end located oppositely of said free arm end.

11. A bait threading device according to claim 1 wherein said arm portion has a threaded bore and wherein said handle portion has a threaded end adapted to be received in the threaded bore whereby said handle portion and said arm portion may be releasably mounted to one another.

12. A bait threading device according to claim 1 wherein said arm portion has an opening therein and wherein said handle portion has a threaded end, the opening in said arm portion being sized to matably receive an end of said handle portion adjacent the threaded end thereof and including a securing cap adapted to mount on said threaded end to retain said handle portion thereon.

13. A bait threading device according to claim 1 wherein said handle has associated therewith a plurality of mounting holes for mounting said shank thereto.

14. A bait threading device according to claim 1 wherein said arm member is affixed to said handle.

15. A bait threading device operative to receive bait and secure a hook and line wherein the bait can be threaded onto the hook, said threading device comprising:
   a handle having a hollow interior, a closed end and an open end;
   an elongated shank having a proximal shank end adapted to be releasably mounted with respect to said handle so that said shank extends longitudinally of said handle, said shank terminating in hook receiving end having a recess sized to receive said hook,
   an arm member mounted to said handle and projecting laterally therefrom to terminate in a free arm end, said arm member provided with a plurality of holes sized to matably receive said proximal shank end for selective mounting of said shank in a selected hole, said arm member having line receiving means for securing said line to said arm such that a length of line may be retained in a taut condition when said hook is mounted in the recess and said line is retained by said line receiving means.

16. A bait threading device according to claim 15 wherein said plurality of holes are operatively sized to permit an adjustable length of said elongated shank to extend into said interior of said handle whereby the height of the shank is variably adjusted.

17. A bait threading device operative to receive bait and secure a hook and line wherein the bait can be threaded onto the hook, said threading device comprising:
   a handle having longitudinal axis:
   an elongated shank having a proximal shank end adapted to be mounted to said handle so that said shank extends longitudinally of said handle, said shank terminating in a hook receiving end adapted to releasably engage the barb of a hook; and
   an arm member detachably mounted to said handle and projecting laterally therefrom to terminate in a free arm end, said arm member having line receiving means for securing said line to said handle such that a length of line may be retained in a taut condition when said hook is mounted in the recess and said line is retained by the line receiving means.

18. A bait threading device according to claim 17 wherein said handle has an open end and an interior sized to store said arm member when said arm member is detached therefrom, and including means for enclosing the open end of said handle.

19. A bait threading device according to claim 18 wherein said handle has an interior sized to accept said elongated shank.

* * * * *